Apr. 17, 1923.

J. BOLF

ANIMAL TRAP

Filed March 4, 1922

1,452,355

Inventor
J. Bolf
By J. K. Bryant.
Attorney

Patented Apr. 17, 1923.

1,452,355

UNITED STATES PATENT OFFICE.

JOHN BOLF, OF MILES, TEXAS.

ANIMAL TRAP.

Application filed March 4, 1922. Serial No. 540,978.

*To all whom it may concern:*

Be it known that I, JOHN BOLF, a citizen of the United States of America, residing at Miles, in the county of Runnels and State of Texas, have invented certain new and useful Improvements in Animal Traps, of which the following is a specification.

This invention relates to certain new and useful improvements in animal traps, particularly of the pivoted jaw type wherein the pivoted jaws are projected to closed position by means of metallic springs.

The primary object of this invention is to generally simplify and improve traps of the above kind.

Another object of the invention is to provide improved means for supporting the bait of the trap and for operatively connecting said bait with the jaws of the trap, which operative connections provide efficient means for releasably holding the jaws in open position.

Another object of the invention is to provide improved means for releasably holding the jaws in open position whereby a very sensitive release will be had when the bait is disturbed by the animal.

With the above general objects in view and others that will appear as the nature of the invention is better understood, the same consists of the novel form, combination and arrangement of parts hereinafter more fully described, shown in the accompanying drawing and claimed.

Figure 1:
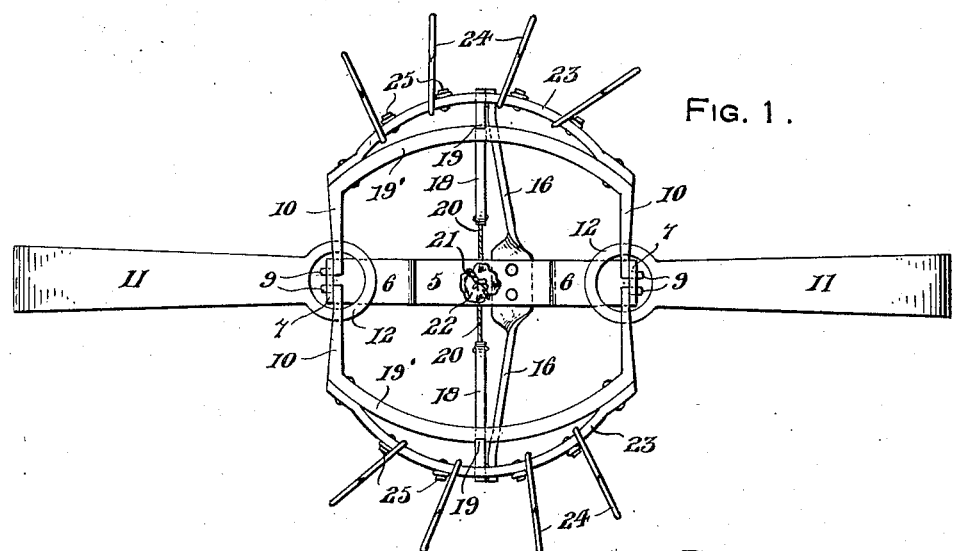
Figure 2:
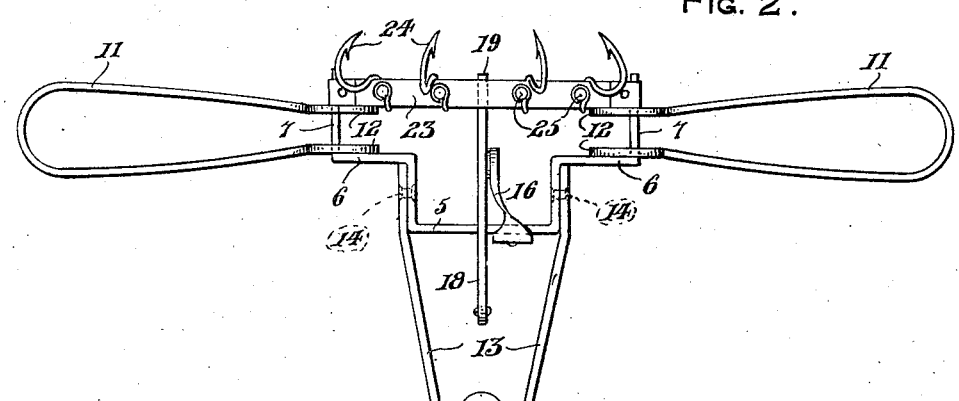
Figure 3:
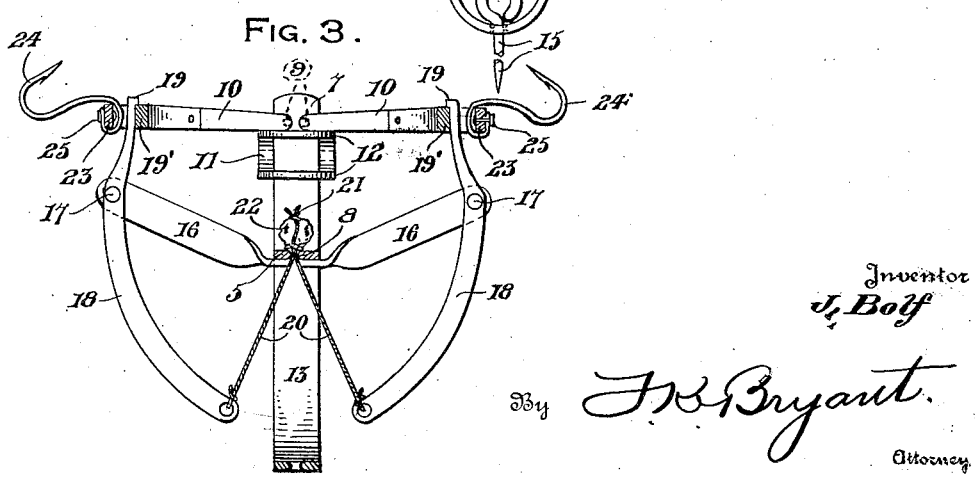

In the drawing, wherein like reference characters designate corresponding parts throughout the several views, Figure 1 is a top plan view of a trap constructed in accordance with the present invention and with the jaws in set position, Figure 2 is a side elevational view of the device shown in Fig. 1 and with an anchoring peg, partly broken away, and Figure 3 is a substantially central transverse sectional view taken through the trap shown in Fig. 1 and clearly illustrating the connection with the bait and the jaw catch mechanism.

The present invention embodies a stirrup 5 having outturned legs and upturned ends, 6 and 7 respectively, the stirrup being centrally apertured, the central aperture of the stirrup 5 being denoted by the numeral 8, and the upturned ends 7 being each provided with a pair of openings disposed side by side in which the ends of U-shaped jaw members are pivotally mounted as at 9, the jaw members being denoted by the numeral 10.

As is usual with this general type of trap, the jaws 10 are forced toward each other by means of U-shaped sheet metal springs 11 having eyes 12 at the ends of the same which are loosely mounted upon the upturned ends 7 between the outturned legs 6 and the jaws 10.

The stirrup 5 is seated between the upper ends of the leg of a U-shaped sheet metal member 13, and said upper ends of the legs of the member 13 are attached to the legs of the stirrup 5 by means of rivets 14 or the like and the base or connecting portion of the member 13 is centrally apertured so that a pointed fastening member 15 may be driven therethrough for holding the trap properly positioned relative to the surface upon which the same is placed, such as the ground.

A cross bar is suitably fastened against the under surface of the base of the stirrup 5 so as to provide arms 16 extending from each side of the base of the stirrup 5, which arms are preferably upwardly inclined as clearly illustrated in Fig. 3 and are of such length as to terminate directly beneath the central portion of the jaws 10. These arms may be integrally connected and twisted at right angles to the central portion of the bar so that the same may be conveniently pivoted as at 17 to the swinging latches 18 which are placed against the side faces of the arms 16 as shown. In other words, the connection between the arms and the latches is a pivotal one for permitting swinging of the latches, and the upper ends of these latches are inturned as at 19 so as to conveniently engage a cross member 19' of the adjacent jaw for holding the latter in open position. The lower portions of the latches 18 are preferably inwardly curved and of such length as to terminate some distance below the stirrup 5 and above the base of the U-shaped member 13, and the flexible members 20 are attached to the lower ends of the latches 18 and extended upwardly through the central aperture 8 in the base of the stirrup 5 for being tied as at 21 about a suitable bait 22 which is disposed upon the base of the stirrup 5 as shown clearly in Figs. 1 and 3. From the foregoing description it will be seen that when a pull is exerted upon the bait 22 the lower ends of the latches 18 will be caused to swing toward each other for outwardly swinging the upper ends of said latches and disengaging the latter from the cross member 19' of the adjacent jaws so that said jaws will be immediately released and forced toward each other by swinging upwardly and inwardly through the medium of the springs 11. Obviously, a reverse of this operation will set the trap in open or operative condition as shown in the drawings.

In order to effectively hold and penetrate the animal caught between the jaws, the attached plates 23 of the jaws are provided with hook members 24 preferably constructed and attached as shown. As shown, a plurality of hooks 24 are provided upon each jaw plate 23 in uniformly or substantially uniformly spaced relation and they include outer ends which are inwardly directed, while the inner ends of the hooks are extended inwardly between the members 19' and 23 of the jaws and then pass under the member 23 and finally coil in eye formation behind the heads of fastening devices 25 which are fixed to the jaw plates 23. Such fastening devices may consist in rivets or the like and will serve to effectively hold the hooks in place, one rivet being provided for each hook as shown.

From the foregoing description it is believed that the construction and operation as well as the advantages of the present invention will be readily understood and appreciated by those skilled in the art.

Minor changes may be made in the invention without departing from the spirit and scope thereof.

What is claimed as new is:—

1. In a jaw trap of the class described, a stirrup having outturned leg portions and upturned ends, a pair of swinging jaws pivoted at their ends to said upturned ends of the stirrup, spring means for normally urging the jaws upwardly toward each other, the central portion of the stirrup being adapted to have a bait disposed thereon, means for holding the jaws in separated position and means including flexible members extending upwardly through the base of the stirrup and attached to the bait and to the jaw holding means.

2. In a jaw trap of the class described, a stirrup having outturned leg portions and upturned ends, a pair of swinging jaws pivoted at their ends to said upturned ends of the stirrup, spring means for normally urging the jaws upwardly toward each other, the central portion of the stirrup being adapted to have a bait disposed thereon, means including flexible members extending upwardly through the base of the stirrup and attached to the bait, said last named means further including a cross bar forming arms projecting at opposite sides of the base of the stirrup, and latch members pivoted upon horizontal axes to the outer ends of said arms and having their upper ends inturned to engage the jaws for holding the same open as well as having their lower ends attached to said flexible members.

3. In a jaw trap of the class described, a stirrup having outturned leg portions and upturned ends, a pair of swinging jaws pivoted at their ends to said upturned ends of the stirrup, spring means for normally urging the jaws upwardly toward each other, the central portion of the stirrup being adapted to have a bait disposed thereon, means including flexible members extending upwardly through the base of the stirrup and attached to the bait, and pivoted latch members attached to the flexible members and engaging the jaws for releasably holding said jaws in separated position, said jaws including intermediate portions with attached jaw plates partially spaced therefrom intermediate the ends of the jaw plates, and animal engaging hooks attached to said jaw plates in spaced relation.

4. In a jaw trap of the class described, a stirrup having outturned leg portions and upturned ends, a pair of swinging jaws pivoted at their ends to said upturned ends of the stirrup, spring means for normally urging the jaws upwardly toward each other, the central portion of the stirrup being adapted to have a bait disposed thereon, means including flexible members extending upwardly through the base of the stirrup and attached to the bait, and pivoted latch members attached to the flexible members and engaging the jaws for releasably holding said jaws in separated position, said jaws including intermediate portions with attached jaw plates partially spaced therefrom intermediate the ends of the jaw plates, animal engaging hooks attached to said jaw plates in spaced relation, said hooks being extended between the central portion of its jaw and the adjacent jaw plate and then bent upwardly along the outer face of the jaw plate and coiled to form an eye, and rivets extending through said eyes of the hooks and said jaw plates for attaching the hooks rigidly in position.

In testimony whereof I affix my signature.

JOHN BOLF.